Figure 1:
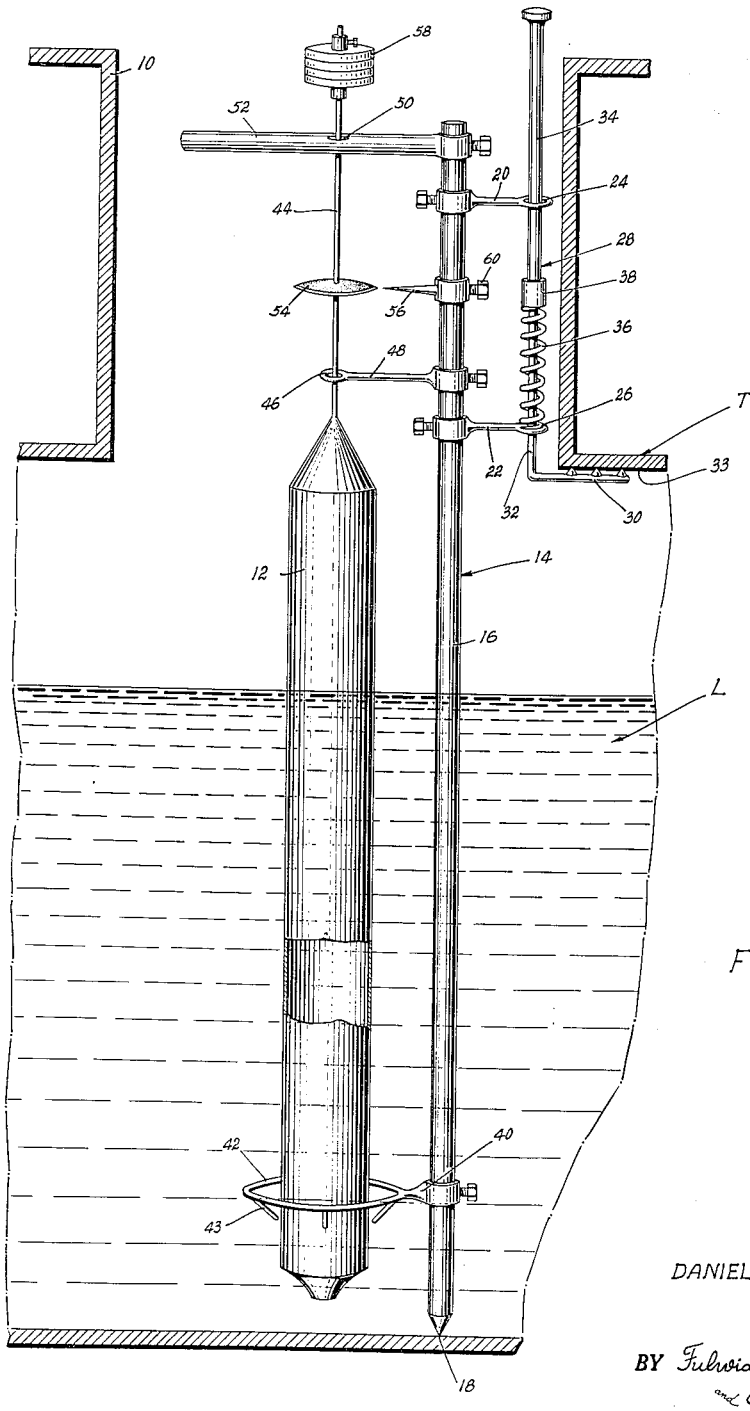

DANIEL W. HOFERER
INVENTOR.

BY Fulwider, Mattingly and Huntley
ATTORNEYS.

United States Patent Office 3,023,620
Patented Mar. 6, 1962

3,023,620
METHOD AND APPARATUS FOR LOADING A TANK WITH A DESIRED WEIGHT OF LIQUID
Daniel W. Hoferer, 3614 Gaviota, Long Beach, Calif.
Filed Aug. 22, 1955, Ser. No. 529,729
7 Claims. (Cl. 73—309)

The present invention relates generally to the field of liquid-containing tanks and more particularly to a novel method and apparatus for loading a tank with a desired weight of liquid.

It is well known that most, if not all, of the states have laws limiting the load which may be carried by a tank truck or tank trailer. These laws are designed to protect the roadways from damage by overloaded tank trucks or trailers. Although most operators are anxious to conform with such laws, various difficulties are encountered in loading a tank truck or trailer with a desired weight of liquid. In most cases weighing scales are not available for use at the liquid loading site. Accordingly, it is necessary to obtain an approximation of the weight of the liquid by first finding the volume thereof, and thereafter computing the weight from such volume when taken in conjunction with the temperature at which the liquid exists and the specific gravity thereof. Inasmuch as the temperature of the liquid being loaded may change during a loading operation or within the varying strata of the load, this method of computing the weight is not always accurate. Additionally, the load may consist of two or more separate liquids having different specific gravities, and mixed in an unknown proportion. As used herein, the term "variable liquid" may mean not only a plurality of liquids having different specific gravities and mixed in unknown proportion, but also a single liquid having strata of varying densities within the tank, as for example, due to temperature changes occurring during loading.

It is a major object of the present invention to provide a method and apparatus for loading a tank with a desired weight of liquid.

Another object is to provide a method and apparatus for loading a tank with a desired weight of liquid which is not affected by the temperature of the liquid or whether or not a plurality of liquids make up the load.

Yet another object is to provide a method for loading a tank with a desired weight of liquid which is fool-proof and does not require the services of a skilled operator.

An additional object is to provide an apparatus of the aforedescribed nature which is simple in design and rugged of construction whereby it may afford a long and useful service life.

Another object is to provide an apparatus of the aforedescribed nature which may be constructed and maintained at low cost.

These and other objects and advantages of the present invention will become apparent from the following detailed description, when taken in conjunction with the appended drawing, wherein:

FIGURE 1 is a perspective view showing a preferred form of apparatus which may be employed to carry out the present invention.

Referring to the drawing, there is shown a tank T which is to be filled with a desired weight of liquid L by means of the novel apparatus and method of the present invention. The tank T may be that of a conventional tank truck, tank trailer, railroad tank car or alternately it may represent a stationary tank. The upper portion of the tank T is formed with a cylindrical filling chute 10.

The preferred form of apparatus embodying the present invention includes a float 12 which is supported for vertical movement within the tank T by means of a support member, generally designated 14. The support member 14 includes a vertically extending column 16 having a pointed lower end 18. The upper portion of this column 16 is adapted to be releasably affixed to the tank T at one side of its filling chute 10. To this end, the upper portion of column 16 is attached to a pair of vertically spaced arms 20 and 22 formed at their free ends with vertically aligned loops 24 and 26, respectively. Disposed within the aligned loops 24 and 26 is a clamp member, generally designated 28. This clamp member 28 includes an anchor shoe 30 which is secured to the lower end of a vertically extending leg 32. The upper surface of this anchor shoe 30 is knurled and normally abuts the underside of the top wall 33 of the tank T. The intermediate portion of this leg 32 is carried within the loop 26 formed on the lower arm 22. The upper portion of the leg 32 is secured to the lower portion of a push rod 34. The intermediate portion of this push rod 34 is slidably disposed within the loop 24 of the upper arm 20. A helical compression spring 36 is interposed between a retainer 38 on the lower portion of the push rod 34 and the lower eye element 22. With this arrangement, the column 16 will normally be held in a stationary position within the tank T by the clamp member 28 and the pointed lower end of the column, the latter abutting the lower surface of the tank T. In order to release the column 16, the push rod 34 is urged downwardly against the force of the spring 36. This action moves the anchor shoe 30 out of engagement with the top wall 33 of the tank T.

The lower portion of the float member 12 is slidably supported by the lower portion of the column 16 by a guide 40 having a ring 42 from which extends a plurality of downwardly and radially inwardly directed guide fingers 43. The upper end of the float 12 is affixed to the lower end of a vertically extending float rod element 44. The lower portion of this float rod element is slidably disposed within a loop 46 formed in the free end of a horizontally extending arm 48 which is secured to the upper portion of the column 16. The upper portion of the float rod element 44 is slidably disposed within a bore 50 formed in a horizontally extending arm 52 which is affixed to the upper end of the column 16. An indicating disc 54 is rigidly affixed to the intermediate portion of the float rod 44. This indicator disc 54 is adapted to cooperate with a pointer element 56 which is connected to the upper portion of the column 16, for a purpose to be fully set forth hereinafter. A plurality of weights 58 are removably supported by the upper end of the float rod, also for a purpose to be set forth hereinafter.

In practicing the present invention it is important that the float 12 and its float rod 44 be completely free with respect to their supports. To this end the float and its float rod are made rotatable within their guides. In carrying out the invention the tank T is initially filled with a desired weight of a reference liquid as for example, the legal load that may be transported within the tank T. The reference liquid will preferably be water, although other suitable liquids may be employed. The loading of the water should be carried out at a temperature at which its weight is known, i.e. 60° F. The loading of the reference liquid may take place while the tank T is disposed upon a suitable weighing scale. Alternately, the desired load may be computed by means of the calibration chart for the particular tank T. This calibration chart indicates the exact volume within the tank for any particular elevation therein. Regardless of the manner in which the legal load in the desired weight is obtained, once the desired weight of reference liquid has been placed within the tank, the float 12 and its float rod 44 will rise to a certain height. Accordingly, the indicator disc 54 will also rise and remain at a certain height. The pointer element 56 is then adjusted upon the upper portion of the column 16 until it is in exact horizontal alignment with the indicator disc 54. The pointer element 56 is then locked in this position by its thumb screw 60. The reference liquid is then drained from the tank T.

When it is desired to load the tank with a legal load of a liquid to be transported, the operator first makes certain that the float 12 and its float rod 44 are free relative to their guide. Next, the liquid is loaded into the tank T until it has reached a level which causes the float 12 and hence the indicator disc 54 to be lifted until the latter is in horizontal alignment with the pointer element 56. Loading of the liquid is then stopped. It will be apparent that at this time the weight of the liquid being loaded will equal the weight of the reference liquid required to maintain the float 12 and the indicator disc 54 in horizontal alignment with the pointer element 56. This will be true regardless of the temperature of the liquid and regardless of the number of components making up the liquid.

It should be observed that with all of the weights 58 secured to the top of the float rod 44, the float will be adjusted to indicate the desired legal load. These weights are so calibrated to provide a proportion of the legal load depending upon the number of weights carried by the float rod 44. In the embodiment disclosed, four such weights 58 are shown affixed to the float rod 44 hence, each of these weights are proportional to twenty-five percent of the desired legal liquid load.

It should be observed that in some instances it may be desirable to employ a gallonage indicator in conjunction with the aforedescribed load weighing device. Such a gallonage indicator may be provided without departing from the present invention. Additionally, different forms of supports for holding the float in place may be employed without departing from the invention. In this regard, under certain circumstances where inflammable liquids are being carried, such as gasoline or light oil, the use of a float support having relatively moving parts may be prohibited. Under such circumstances, a rigid float support could be employed in conjunction with a removable float. In this way the float could be readily cleaned after each weighing operation. In any event, however, the supporting column for the float must be maintained in vertical alignment with the tank in order to insure accurate results, and additionally the bottom of the float should be free of the bottom of the tank T, when the indicator disc 54 is in horizontal alignment with the pointer element 56.

Various modifications and changes may be made with respect to the foregoing description without departing from the spirit of the invention or the scope of the following claims.

I claim:

1. A method of loading a tank with substantially a desired weight of a variable liquid which includes, filling said tank to said desired weight with a reference liquid, inserting float means in said reference liquid to displace a volume of said reference liquid, said volume extending from the top of said reference liquid to a depth slightly less than the depth of said reference liquid, establishing a reference line between a first point on said float means and a second point that is fixed relative to said tank, emptying said reference liquid from said tank, and re-filling said tank with said variable liquid until said first point is aligned with said second point.

2. A method of loading a tank with substantially a desired weight of a variable liquid which includes, filling said tank to said desired weight with water, inserting float means in said water to displace a volume of said water, said volume extending from the surface of said water to a depth slightly less than the depth of said water and having a substantially uniform cross-section, establishing a reference line between a first point on said float means and a second point that is fixed relative to said tank, emptying said water from said tank, and re-filling said tank with said variable liquid until said first point is aligned with said second point.

3. A method of loading a tank with substantially a desired weight of a variable liquid which includes, filling said tank to said desired weight with a reference liquid, inserting float means in said reference liquid to displace a volume of said reference liquid, said volume extending from the top of said reference liquid to a depth slightly less than the depth of said reference liquid, establishing a horizontal reference line between a first point on the exposed portion of said float means and a second point that is fixed relative to said tank, emptying said reference liquid from said tank, and re-filling said tank with said variable liquid until said first point is horizontally aligned with said second point.

4. A method of loading a tank with substantially a desired weight of a variable liquid which includes, filling said tank to said desired weight with water, inserting float means in said water to displace a volume of said water, said volume extending from the surface of said water to a depth slightly less than the depth of said water and having a substantially uniform cross-section, establishing a horizontal reference line between a first point on the exposed portion of said float means and a second point that is fixed relative to said tank, emptying said water from said tank, and re-filling said tank with said variable liquid until said first point is horizontally aligned with said second point.

5. Apparatus for loading a tank with a predetermined weight of variable liquid comprising: a vertically elongated substantially cylindrical float of sufficient density to be buoyantly submersible to a predetermined extent in a reference liquid of a depth less than the height of said float; a coaxially upwardly extending elongated rod on said float having a horizontally disposed indicator disc; a vertically elongated column having a horizontally extending arm at its upper end formed with a bore slidably receiving said rod of said float; a pair of horizontally extending vertically spaced-apart arms on said column; a generally L-shaped member having a vertically extending portion slidable through a pair of aligned grooves formed in said pair of arms and having a horizontally extending anchor shoe engageable with a downwardly facing surface of a tank; an abutment on said vertically extending portion of said L-shaped member between said pair of arms; a spring interposed between said abutment and the lower one of said pair of arms to bias the lower end of said column into engagement with an upwardly facing surface of a tank; a guide ring on the lower end of said column having a plurality of radially inwardly extending fingers surrounding the lower end of said float, said ring, fingers and said bore of said first-mentioned arm being coaxially arranged and adapted to maintain said float in vertically upright position when buoyant; and a pointer element on said column opposite said float rod that is vertically adjustable relative to said column.

6. A method of loading a tank with substantially a desired weight of a variable liquid which includes: filling said tank to said desired weight with a reference liquid, immersing a float in said reference liquid to displace a vertical column of said reference liquid extending from the surface to a depth slightly less than the depth of said reference liquid, whereby said immersed float is buoyantly supported by the hydrostatic pressure at its lower end, establishing a relationship between a point on said buoyantly supported float means and a fixed point on said tank, emptying said reference liquid from said tank, and filling said tank with a variable liquid to a depth sufficient to buoyantly support said float means and to re-establish the same relationship of said points.

7. A method of loading a tank with substantially a desired weight of a variable liquid, said weight consisting of an absolute volume of said liquid and a hydrostatic weight of strata of said variable liquid superimposed on said absolute volume, comprising: filling said tank to said desired weight with a reference liquid, displacing a vertical volume of said reference liquid from the surface to a depth less than the depth of said reference liquid with a float means immersed in said reference liquid, said float means thus being buoyantly supported above said absolute volume, establishing a relationship between a point on said buoyantly supported float means and a fixed point on said tank, emptying said reference liquid from said tank, and filling said tank with a variable liquid to a depth sufficient to buoyantly support said float means and to re-establish the same relationship of said points.

References Cited in the file of this patent

UNITED STATES PATENTS

| | | |
|---|---|---|
| 232,245 | Deschamps | Sept. 14, 1880 |
| 756,905 | Stalting | Apr. 12, 1904 |
| 763,716 | Bray | June 28, 1904 |
| 967,378 | Hillmer | Aug. 16, 1910 |
| 988,342 | Hillmer | Apr. 4, 1911 |
| 1,646,317 | Rein | Oct. 18, 1927 |
| 2,001,335 | Urfer | May 14, 1935 |
| 2,038,273 | Eynon | Apr. 21, 1936 |
| 2,189,236 | Watson | Feb. 6, 1940 |
| 2,457,905 | Korody | Jan. 4, 1949 |
| 2,614,578 | Stickney | Oct. 21, 1952 |
| 2,653,478 | Harper | Sept. 29, 1953 |

FOREIGN PATENTS

| | | |
|---|---|---|
| 248,353 | Germany | June 20, 1912 |
| 475,157 | France | Feb. 2, 1915 |